_United States Patent_ [19]

Baumann

[11] 4,212,069
[45] Jul. 8, 1980

[54] PARATRANSIT FARE COMPUTATION AND DISPATCHING METHOD

[76] Inventor: Dwight M. Baumann, 4516 Henry St., Pittsburgh, Pa. 15213

[21] Appl. No.: 913,248

[22] Filed: Jun. 6, 1978

Related U.S. Application Data

[63] Continuation-in-part of Ser. No. 719,118, Aug. 31, 1976, abandoned.

[51] Int. Cl.² .................. G06F 15/56; G08G 1/12
[52] U.S. Cl. .................................. 364/467; 364/436
[58] Field of Search .................... 364/467, 466, 436

[56] References Cited

U.S. PATENT DOCUMENTS

| | | | |
|---|---|---|---|
| 3,692,988 | 9/1972 | Dlugos et al. | 364/467 X |
| 3,845,289 | 10/1974 | French | 364/436 |
| 3,886,515 | 5/1975 | Cottin et al. | 364/436 X |
| 3,953,720 | 4/1976 | Kelch | 364/467 X |
| 4,051,913 | 10/1977 | Gudea | 364/466 X |
| 4,084,242 | 4/1978 | Conti | 364/466 |
| 4,092,718 | 5/1978 | Wendt | 364/436 |
| 4,093,161 | 6/1978 | Auer, Jr. | 364/436 X |
| 4,118,775 | 10/1978 | Boyce | 364/467 |

Primary Examiner—Edward J. Wise
Attorney, Agent, or Firm—Rines and Rines, Shapiro and Shapiro

[57] ABSTRACT

This disclosure is concerned with rendering more flexible and useful the fare computations and dispatching services in the taxi industry and the like, by a novel type of centralized computed control of and cooperating and interfacing with, vehicular meters, enabling overlapping multiple-location pick-up and delivery for a plurality of customers and with automatic route, time, traffic condition and related information and/or corrections remotely introduced into the meter calculations and display.

8 Claims, 3 Drawing Figures

PARATRANSIT FARE COMPUTATION AND DISPATCHING METHOD

CROSS-REFERENCE TO RELATED APPLICATION

This is a continuation-in-part of applicant's prior copending application Ser. No. 719,118, filed Aug. 31, 1976, (now abandoned).

The present invention relates to paratransit fare computation and dispatching methods or similar computational applications, being more particularly concerned with adapting taxi meters and the like to accommodate simultaneous and overlapping customers with varied pick-up and delivery locations, and with automatically provided sophistication and equitably proper control and/or corrections for such factors as time of day, traffic conditions, minimal routing and the like. While hereinafter described with reference to the illustrative and preferred application to taxi operations, it should be understood that the concepts and techniques herein-involved may also be applied to other applications, as well, where the features or some of the features of the invention may also be desired.

It has previously been proposed to provide computation circuits in taxi meters and the like for separately computing the fares of a plurality of passengers with overlapping trips as disclosed, for example, in U.S. Pat. No. 3,953,720; and numerous systems have been proposed for computing fare indications with the aid of pulse measuring systems for determining time and distance, as disclosed, for example, in U.S. Pat. Nos. 3,843,870 and 3,860,806. Of course, the concept of radio communication with vehicles or other moving objects for controlling the same or functions therein has long been proposed in a variety of applications as disclosed, for example, in U.S. Pat. Nos. 3,284,627 and 3,286,091; and the use of a central dispatching or control office with vehicle communication links has long been used in the railroad and other arts.

All of this, however, falls far short of the concept underlying the present invention which involves a central control system for monitoring not only the real time taxi fare needs of the taxi fleets, but for enabling central computation of the fares, estimated trip time information and other needs of over-lapping trip passengers, without penalty to a deviated rider, together with the sophisticated use of experience in the peculiarities of different routes, traffic patterns and exigencies or difficulties of travel at different times of day or weather and the like. The invention, thus, introduces compensations and corrections based upon the particular routes and time of day with its differing traffic and similar circumstances, and, in addition, may select the most expeditious, economical or otherwise suitable routes for the driver to take consistent with the best service to the customer-13 again from centralized stored information elicited when the pick-up and destination points are communicated to the central computing and controlling headquarters.

All of this is done, moreover, in a manner that, once the pick-up and destination is communicated, does not involve the driver in so far as the computation and presentation of the indicated data is concerned. The prior art approaches to fare calculations and time-distance techniques for rate calculation and the like, with emphasis upon calculations effected at the taxi meter, seem to have led the art away from the concept of the present invention since such techniques are not practically adapted to incorporate historical data, minimal route and related corrections which are eminently feasible with the centralized computation and automatic precalculation and remote control of local meter displays in accordance with the present invention.

It is accordingly an object of the invention to provide such a new and improved method of and system for automatic taxi meter control, incorporating statistical corrective data for automatic overlapping-trip fare computation, including such important refinements as compensation for traffic conditions, weather and routing from stored historical and statistical data relating to the same; the method and system being thus not subject to the limitations and relatively less sophisticated capabilities of prior art proposals.

A further object is to provide a technique whereby real-time indications may be provided to the central station of various taxicab mechanical data such as engine temperature, oil temperature and oil pressure, as well as such data as how many seats in the taxicab are occupied.

A further object is to provide a system wherein emergency signals can be provided to the central station and which may be inconspicuously communicated by the taxicab operator to indicate, for example, that police aid is desired.

A further object is to provide such a novel method and system that may be applicable to other vehicular and related control applications, as well, wherein advantages and functions similar to those attained by the invention in taxi usages may be desired.

Other and further objects will be explained hereinafter and are more specifically delineated in the appended claims.

In summary, this invention embraces a method of paratransit fare computation and dispatching referred to herein as the Ride Shared Vehicle Paratransit System (RSVP System). Information relating to routes and distances between street addresses and historical data as to time for normal transit therebetween under different times of day and traffic conditions is stored in a computer. A communications link peripherally interfaces the central station, and, also, the central dispatcher, with each of a plurality of taxicabs. The taxicab operator communicates customer pick-up and deposit addresses to the central station along the communications link. Using the stored time and distance information, the customer fares are calculated and time of transit are estimated and are transmitted along the communications link to the selectively addressed vehicle. Finally, the respective vehicle receives and automatically displays the transmitted fares and times. Preferred details are hereinafter set forth.

The invention will now be described in connection with the accompanying drawings wherein the symbols used conform to the International Organization for Standardization (ISO) Recommendation R1028 Flowchart Symbols for Information Processing, and conform to American National Standard Flowchart Symbols and Their Usage in Information Processing, X3.5-1970.

Figure 1:
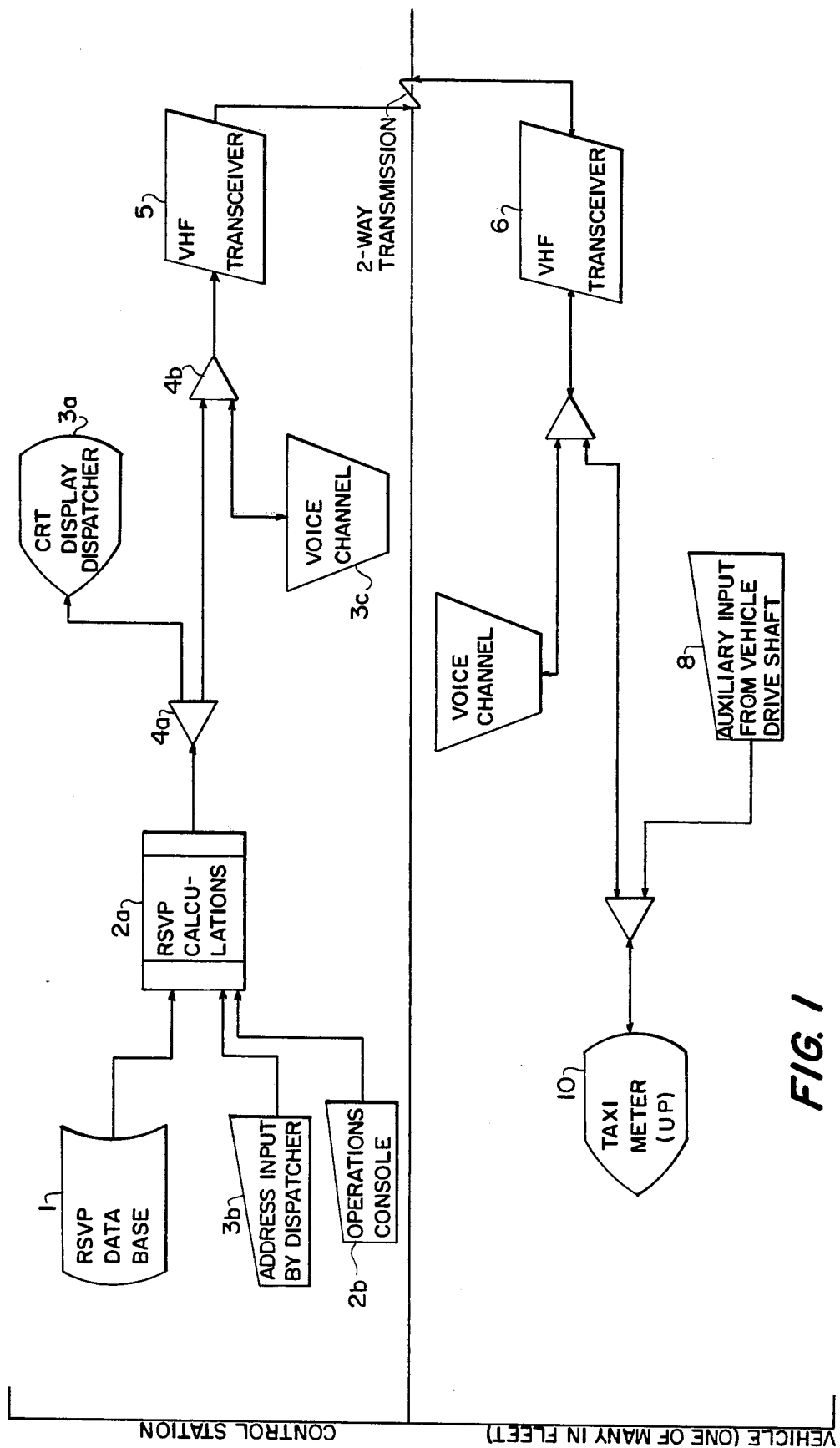
FIG. 1 is a flow-chart in block diagram form of the entire RSVP System illustrating preferred RSVP System hardware.

It is now in order more fully to describe the underlying concept of the invention with reference to the illustrative specific exemplary embodiment of the same as shown in the drawings.

CENTRAL STATION HARDWARE

The Central Station of FIG. 1, serves as the focal point for all operations, which includes the following basic hardware components:

(1) The Central Computer 2a, labeled "RSVP calculations," its Monitor Console 3a, labeled "CRT Display Dispatcher," and a cartridge disk storage unit 1, termed "RSVP data base";

(2) a Dispatcher Console 3b, labeled "address input by dispatcher," for entering trip data and displaying system information at 3a;

(3) a Backup Console which provides backup manual dispatching capabilities shown as a "voice channel" 3c; and (4) vehicle communication hardware 5 for transmitting and receiving vehicle messages.

The Central Computer 2a will perform all calculations, communications processing, and real-time monitoring in the system. In a tested system, a PDP 11/10 mini-computer served as the Central Computer, although initial program development was performed on a PDP 11/40. The PDP 11/10, which can address a maximum of 32 K 16-bit words, was configured with 16 K words of core memory, and an internal 60 Hz line frequency clock provided timing signals for real-time monitoring, with an extended arithmetic element permitting hardware fixed-point integer-multiplication and division.

The Operation Console 2b of the Central Computer 2a consisted of a hard copy terminal equipped with a paper tape reader/punch, used for entering programs and for monitoring computer operations. All programs were developed by using a disk based operating system with text editing capabilities; however, after development, the system programs function independently of the operating system.

Secondary storage at 1 for the system was provided by a moving-head cartridge disk system containing one fixed disk and one removable disk cartridge, each of which has a 2.5 million word capacity. The disk system was completely compatible with DEC hardware and software. Thus, vendor software protection features permitted using the device to store operating system files in addition to storing the hash-coded Address-Coordinate File and the Time/Distance File.

Under normal operating conditions, the Dispatch Console of the Control Center station 3a and 3b may be used to enter origin or pick-up and destination or deposit address data and to display operating information (e.g. fares, estimated trip times for each hire, system messages, vehicle messages). In the tested embodiment, the Dispatch Console was the Cathode Ray Tube terminal 3a which stored up to 1920 characters (24 lines of 80 characters) and which had a protected field capability for display in pre-arranged screen formats.

The computer interface for the Dispatch Console 3a and 3b and for the Operations Console 2b was a standard DEC DL11-E asynchronous line interface with modem control capability which permitted demonstrations at remote locations using voice grade telephone lines. Vehicle communications were routed through a special purpose interface with 64-bit (i.e. four word) input/output capability. The interface supported one or two base station transmitters and was capable of adequately communicating with up to 500 vehicles. Since a portion of the interface capacity may be unused, various system display functions may easily be added by connecting interface outputs to a stand-alone static display. For example, the display could indicate emergency conditions without tying up the Operations Console 2b; and the before-mentioned Dispatch Console 3a functions may also be displayed thereon at the central station.

The interfacing Command Modules 4a and 4b interpret commands, execute commands, and control vehicle communications. They also format the Operations Console display at 3a, check input data for validity, and initialize internal buffers with valid data.

Vehicle Hardware

Turning, now, to a possible implementation of the vehicle hardware generally indicated at 10 in FIG. 1 and usable with the system of the invention, the vehicle display may show the trip fare and estimated trip time of each hire generated by the Central Computer, or the fare as determined by the electronic meter in the event of a computer failure, the mode in which fares are calculated by computer being the normal operating mode and the electronic meter capability providing a manual back-up. Trip and fare data are continuously accumulated and may be accessed manually or by the computer, with the meter distance fare rate and time fare rate being adjustable to accommodate virtually any fare rate structure.

Digital radio transmission along the communications link between the central station and the vehicles, with individual vehicle addressing, error checking and command control capabilities, may provide the means for computer-based control of the entire fleet, with communications and monitoring capabilities being expandable by incorporating micro-processor techniques.

As before indicated, the vehicle unit operates either in conventional taxi mode or the computer-controlled mode with the latter mode initiated after the digital carrier is detected and the vehicle has been addressed. The transmission along the radio communications link can then be either a system code or the display code. In the present demonstration system, the display is activated with a flag button, though the display, flag and hold buttons may all be simultaneously activated by a display on (DO) code immediately following the vehicle ID. This action locks out the backup meter. The DO sets the display to 00/0000, and indicates that, for example, the next six words sent to the vehicle are the fare and trip time followed by an EOM (End-of-message). (If the carrier has not been received for 50 milliseconds, an EOM is assumed).

The fare display at 10 remains set until the vehicle operator turns the display off as by depressing the flag button. This will allow separate fares for each trip. The minute display begins to decrement as soon as DO (or vehicle addressed) is received. The normal meter mode can be initiated at any time by depressing the flag button so that, in the event of a communication or computer failure, the meter automatically provides back-up fare calculations, all as more fully described in the Carnegie-Mellon publication herein cited.

The meter unit 10, includes a memory, and speedometer cable (SC) sensor 8 form the basic vehicle meter, requiring input from the SC sensor and two clock frequencies such as (960 Hz and 1 Hz). It outputs are fare increments and 1/10 mile pulses. Fare counters total the fare increments and drive the display unit. The 1/10 mile pulse is used to increment the complete daily (or monthly) mileage on the vehicle. The meter memory may contain the total 1/10 miles, the paid 1/10 miles, the number of flag drops (i.e. trips), the accumulated revenue collected in meter mode, and the accumulated revenue collected in computer-controlled mode. Memory capacity may be expanded to permit additional monitoring and the meter memory may be read from the vehicle remotely via computer or with, for example, a key lock rotary selector switch. After the meter memory is read, it may be zeroed.

The meter unit will permit fare rate structure adjustments using wire jumpers that determine the cents/minute, cents/mile, and threshold velocity (i.e. the point at which the instantaneous time fare rate is the same as the distance fare rate). Below the threshold velocity, fares are based only on time; above, only on distance. The fare jumpers may be sealed to prevent unauthorized adjustments and may be located on the display processor/memory circuit board and set initially by switches.

The communication and control hardware for a vehicle to be used in the taxi fleet operated under this mode may consist of a six digit display, electronic fare meter, and digital radio transmission equipment. The display shows the trip fare and estimated trip time generated by the Central Computer, or the fare determined by the electronic meter in the event of a computer failure. Trip and fare data are continuously accumulated in the meter, and may be accessed manually or by the computer and the meter may readily also be adjusted to accomodate virtually any fare structure. Digital radio transmission, with unique vehicle addressing, error checking and command control capabilities, will permit efficient computer-assisted control of a taxi fleet.

In addition to a speedometer cable sensor, connected to the vehicle driveshaft, various other sensors may be used includig oil pressure, amount of gas, engine temperature, engine vacuum, and other quantities that are good indicators of the vehicle's mechanical status, which can be reported to the base station. Other, more specialized sensors such as set switches to verify occupancy, or hidden panic switches to indicate an emergency by the driver, can be incorporated into the system. This real-time monitoring capability also permits regulatory agencies to inspect a transit operation effectively from the base station using the monitor console.

The display unit may, for example, utilize LED or incandescent two-digit displays for indicating time in minutes, four-digit display for fares up to $99.99, the hold and flag buttons (which may be illuminated when depressed), and a communication keyboard.

Transmission Error Detection and Vehicle Identification

As for ID and error encoding and decoding, the vehicle identification numbers (such as 0–99) may be switch selectable on the vehicle FSK transmitter and receiver card. Each ID word in the tested system was two bytes long and contained one initial control code nibble and three ID number nibbles. The control code specified the function to be performed by the vehicle receiver. Identification numbers were encoded in binary coded decimal (BCD) format.

ID numbers may be decoded on the receiver card by sequentially comparing the address bytes. If the first byte received matches the first bank of switches, the decoder is advanced, which in turn activates the second bank of switches. If the second byte matches, the vehicle addressed flag is set. Subsequent data will then be processed and the addressing cycle is completed. The addressed flag is cleared either by dropping the carrier for 50 milliseconds or by sending an end of message (EOM) code.

The vehicle ID is encoded on a universal transmitter card (universal because it may be used for the base station as well). The transmitter may be set, by switches or by the computer, to transmit either two bytes for complete identification (contained in two words), or one byte. In transmissions from vehicles to the base, error, hardware malfunction, emergency, and data out flags are all tied into the first nibble out (switch bank 1, Bits 0-3), which ordinarily would be set to the address code. Sensing elements and status latches may be added to permit transmitting important status conditions as well as the ID number.

To insure accurate transmission in noisy commercial radio bands, it may be desirable to do some form of error checking on incoming messages. Two separate techniques may be utilized. Consider, for example, a transmission format consisting of:

1 word = 16 bits = 3 start bits + parity bit + 8 data bits + 4 stop bits.

The start and stop bits can be checked for data over-/under run and message completeness, and the parity bit may be used to check data validity. If an error occurs after the addressing words have been received by the vehicle, an error flag is set and returned with the vehicle ID. Error flagging at the base station may be done visually and digitally.

A vehicle printer may also be incorporated for printed receipts. In multi-origin/destination applications, the printer would also be used to differentiate between trips.

The Dispatcher essentially acts as a switchboard by routing information to and from the interface. The status of interface output bits controls the information flow. In general, after a fare and an estimated time have been computed and displayed, if the Transmit (T) command is entered, the information is sent along the radio communications link in FSK format to the appropriate vehicle. If the message is received without error, the vehicle response consists of its ID alone. If, however, an error has occured, an error code is returned with the vehicle ID, an error message is displayed on the CRT 3a, and the message is transmitted again.

R.S.V.P. DATA BASE

Figure 2:
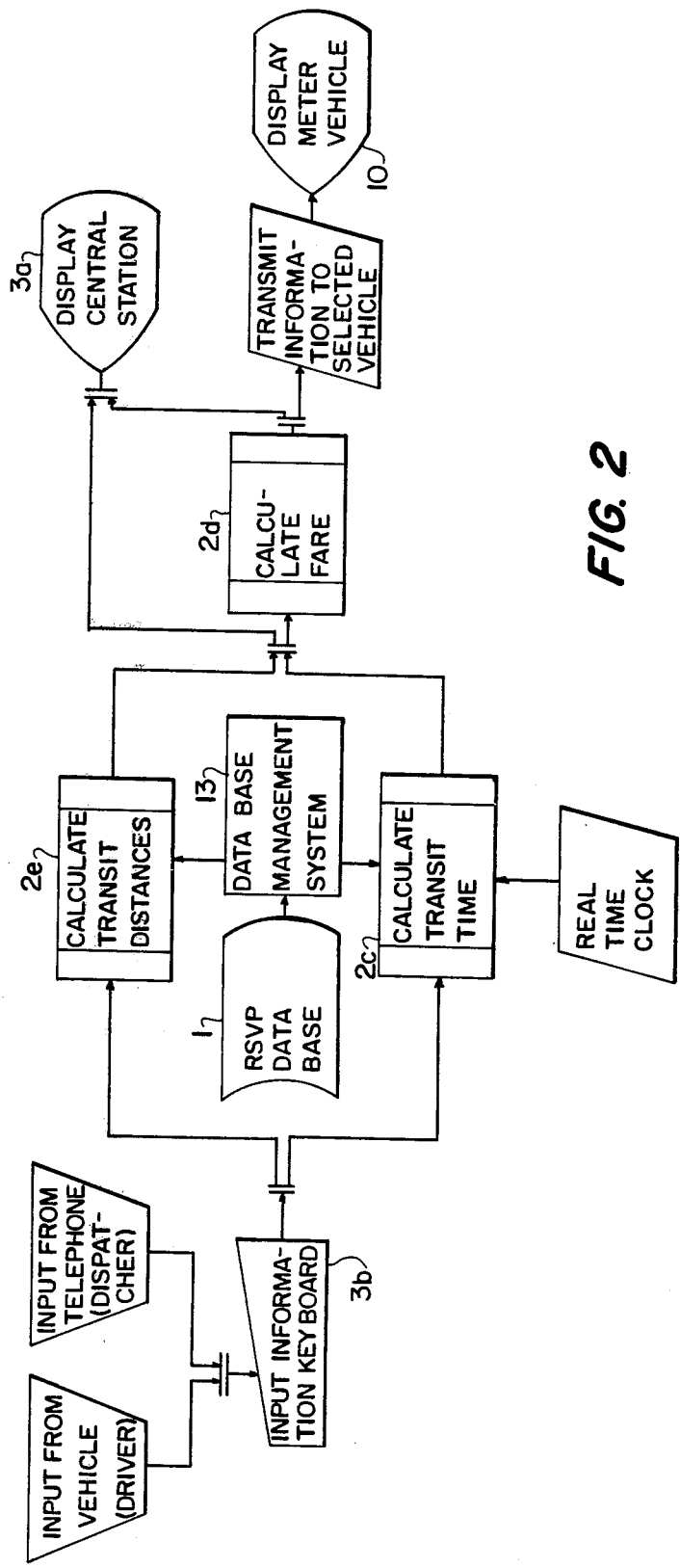
FIG. 2 is a flow-chart in block diagram form of the calculation scheme for the RSVP System, illustrating the software and processing system aspects of the invention.

The basic software includes a vendor-supplied operating system and the Data Base Management System 13 of FIG. 2. Considering, now, further details of the computation data base management unit at the central station and dispatch console 3a and 3b of FIG. 2, the system contains a control structure 13 which links processing modules and data files including:

(1) A Time/Distance File within the R.S.V.P. Data Base 1 containing travel times and distances between zones in the service area;

(2) An Address Coordinate File also in the Data Base 1 containing state plane coordinates for all street addresses in the service area that makes possible interpolation of distances from the centroid of each appropriate zone to augment the interzonal time and distance file above.

(3) A Processing module within the data base management system 13 cooperative with respective calculation portions 2c, 2d and 2e for computing fares and estimated travel times; and (4) A processing module within 13 for interpreting and executing commands.

The Time/Distance File contains shortest-time-path distances, travel times during uncongested periods, and travel time during congested periods for trips between all possible pairs of traffic zones. The Address-Coordinate File associates state plane coordinates with all street addresses in the service area. The initial service area, in the test system before-mentioned, consists of 100 traffic zones with 2,179 unique streets, and encompasses approximately 17 square miles. System files require 251,904 words of disk storage.

Considering, first, the expanded flexibility attainable by the invention even for a single-origin/destination trip, the fare may be calculated on the basis of estimated travel distance and travel time. Zone-to-zone time and distance data are obtained from a Time/Distance File which, in the experimental version tested, was originally developed by the Southwestern Pennsylvania Regional Planning Commission (SPRPC). The file contains shortest-time-path distances, travel times during uncongested periods, and travel times during congested periods for trips between all possible pairs of traffic zones. An Address-Coordinate File, also developed by the SPRPC, associates state plane coordinates with all street addressed in the service area. The time and distance for a trip between a specific origin and destination pair are obtained by adjusting the zone-to-zone time and distance in the Time/Distance File by a correction factor based on the information available in the Address-Coordinate File.

The Address-Coordinate File consists of two distinct components: a Street Name File and a Street Segment File. Each Street Name record contains a pointer to a chain of segment records; each segment record contains the state plane coordinates for a particular set of address ranges on the street, and a pointer to a record in the Time/Distance File. Each record in the Time/Distance File contains travel data for trips from the given origin zone to all other zones. The fare calculation for a specific trip requires obtaining origin and destination coordinates, retrieving and adjusting the appropriate distances and times, computing the fare, and displaying the results.

In the preliminary system, the records in the Street Name File were assigned to disk locations by a hashing algorithm. The initial algorithm simply treated six characters from a street name as three 16-bit integers and multiplied them together. Sixteen bits were masked from the result and used to specify an absolute disk location for one "bucket." Up to 39 street names can be stored in one bucket without causing overflow. When overflow occurs, the extra records are placed in the first bucket on the track which has been addressed. The distribution from the hashing algorithm is such that there is sufficient overflow space available on each track.

The Street Name File may contain:

(1) The street name:
(2) The street suffix;
(3) The last three digits of the zip code area;
(4) A field for a frequency-of-use count:
(5) A pointer to the first street segment for the street.

Conceptually, the Time/Distance File may be viewed as an $N \times N$ matrix containing information about all possible trips among N zones. Element (i,j) in record i, refers to a trip originating in zone i and terminating in zone j. The first two fields in record i contain the state plane coordinates of the centroid of zone i; the third field contains accumulated computed distances for trips within zone i.

Each element (i,j) in record i consists of sub-fields that may contain the following:

(1) A flag field to indicate special circumstances;
(2) The accumulated number of trips from zone i to zone j;
(3) The shortest-time-path distance from zone i to zone j;
(4) The average velocity for trips from zone i to zone j;
(5) The accumulated actual trip distances from zone i to zone j;
(6) The accumulated actual trip times from zone i to zone j;
(7) The time of the last update of average velocity;
(8) A special distance adjustment factor:
(9) A special velocity adjustment factor.

In element (i,i), two changes in sub-field assignments occur. Sub-field two contains the distance adjustment factor for trips within zone i. Use of the special distance and velocity adjustment factors is determined by setting appropriate bits in the flag field.

The Address-Coordinate and Time/Distance Files are organized to minimize read/write arm movement when retrieving trip information. Conceptually, the physical disk drive may be divided into cylinders, with four tracks in each cylinder. Read/Write heads can thus be positioned over four tracks simultaneously when a given cylinder is accessed. In the present organization, one track is used for street name records, two tracks for the associated segments of the remaining track for Time/Distance File records (three per track). Although assignment of Time/Distance records is arbitrary, after operating experience is accumulated, the three most frequently accessed traffic zones for segments in a cylinder may be placed on the available track. This reorganization will further reduce the arm movement required for fare calculations.

Calculation of Fares

The fare for the single-origin/destination trip is calculated on the basis of estimated travel distance and traveltime from the centroid-to-centroid distances and times for the specific pairs of traffic zones in the Time/Distance File. This data is adjusted by correction factors to yield estimates for trips between the indicated origin and destination. The specific adjustments for off-peak and peak times are more fully described in A Multi-Origin/Destination Taxi System, prepared for the U.S. Department of Transportation by Carnegie-Mellon University, September, 1975, and later issued by NTIS as DOT-TST-76-84, incorporated herein by reference and containing fuller details of the tested preliminary system.

The metered taxi fare for a single-origin/destination trip can be expressed as $$f = f_o + f_c,$$

where $f_o$ is the fixed portion, $f_c$ the variable portion, and f the total fare. Since the variable portion is dependent on distance x and time t of the ride, an equitable variable fare will be such that $$f_c(x_1+x_2, t_1+t_2) = f_c(x_1,t_1) + f_c(x_2, t_2),$$

where $x_1$ and $x_2$ are the distances of the two portions of a ride with an intermediate stop while $t_1$ and $t_2$ are the corresponding times. Hence variable fare must be a linear function of distance and time, i.e.

$$f_c(x, t) = ax + bt,$$

where a and b are constant coefficients. Then, the total fare can be expressed as:

$$f(x, t) = f_o + ax + bt,$$

Which is a linear combination of time and distance. Since both off-peak time and peak time are available, stratification of fare with respect to time-of-day (peak or off-peak) is straightforward. The constant $f_c$ and the coefficients a and b can, in general, be adjusted to fulfill desired objectives. In the system for single-origin/destination trips, for example, they may be chosen to reflect current practice in metered taxi fare calculation.

The taxi meter charges a fixed fare $f_c$ for the "flag drop" and incremental charge c of each hire for every ($\delta$) miles travelled or ($\tau$) minutes elapsed after pick-up, whichever is reached first. Under conditions of idealized stop-and-go traffic, the trajectory of a vehicle is either stationary or moving with a constant speed $v > \delta\tau$.

The Fare Module calculates fares and estimated trip times, and places the results in a communication buffer for further processing by the Command Module. To insure reasonable system response times as these expansions are implemented, Command Module message processing subroutines may be interrupt-driven, and disk files organized to minimize read/write head movement. A count field is reserved in each file record to permit periodic file reorganization based upon record activity.

Key program steps for achieving the calculations of the system in FIG. 2 are: selection of the appropriate address information from the R.S.V.P. Data Base 13; and forwarding the data from the Data Base to the proper calculation subroutines for distance 2e of FIG. 2, time 2c of FIG. 2 and trip fare 2d of FIG. 2.

Figure 3:
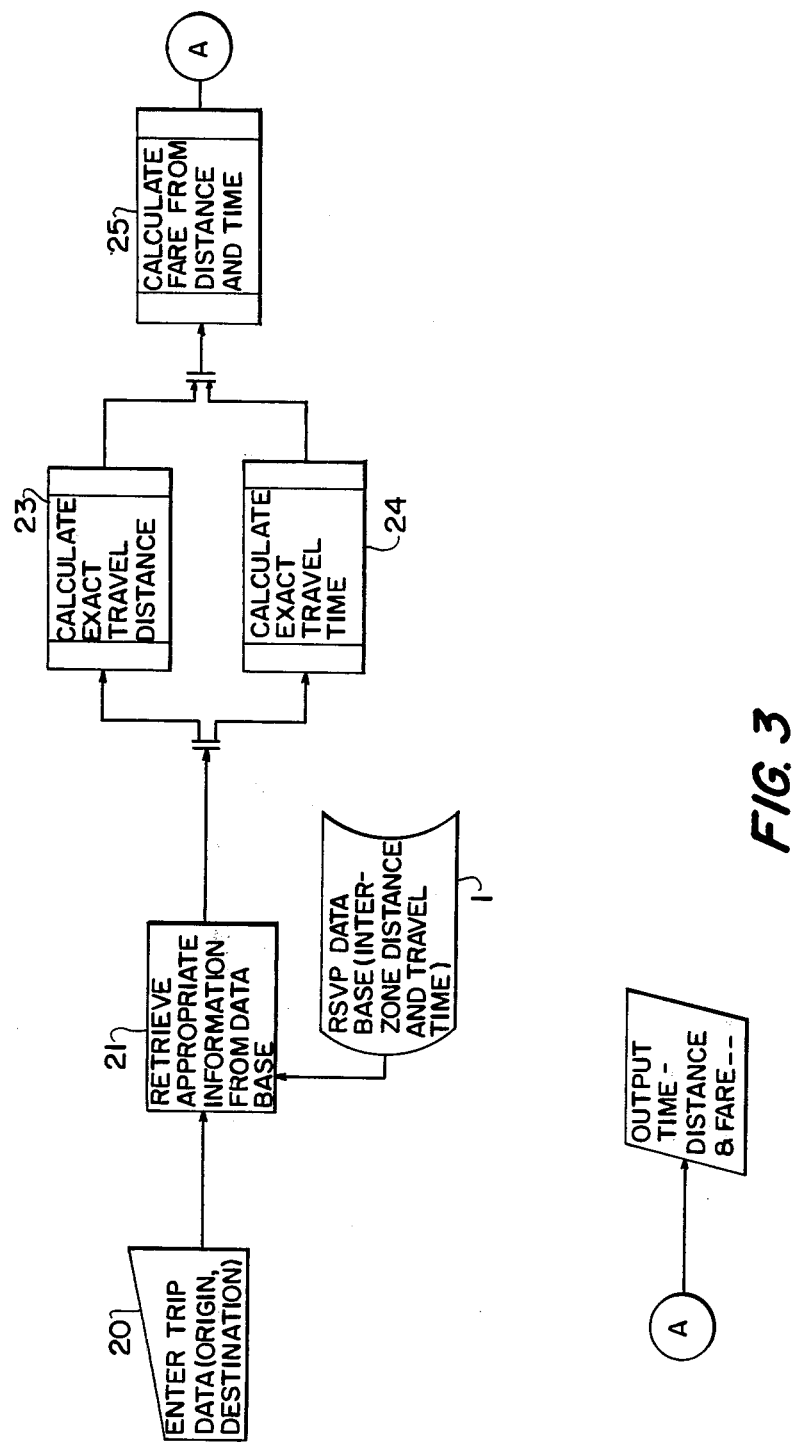
FIG. 3 is a flow-chart in block diagram form of the calculation scheme for the computer program used in the invention.

The fare for a single origin/destination trip is calculated on the basis of estimated travel distance and travel time. The estimates are obtained from the centroid-to-centroid distances and times for all possible pairs of traffic zones in the Time/Distance File stored in the R.S.V.P. Data Base 1. These data are adjusted by correction factors to yield exact figures for trips between a specific origin and destination. Once a trip distance and trip time are determined through simple, conventional calculation techniques, they are used to determine the trip fare. A more detailed look at the entire calculation scheme is available in the previously cited publication by Carnegie-Mellon University of Pittsburgh, Pa., available from the National Technical Information Service as DOT-TST-76-84. Chapter 3 of this publication, "Fare Calculation," pages 13 to 17 detail the exact technique as employed in the method disclosed herein. FIG. 3 of this application shows a simple flow diagram demonstrating the logic involved in the actual operation of the program.

The trip data, comprised of the desired origin and destination, is entered into the computer system by the Keyboard 20 of FIG. 3. This information is used to retrive selected information from the disk memory which contains the R.S.V.P. Data Base 1. This selection of the appropriate interzone travel distances and times is achieved using conventional, well known computer programming techniques, and is represented in FIG. 3 by block 21. This trip information is applied to subroutines, within the computer system, which are individually programmed to compute the exact fare and exact distance utilizing the pre-programmed arithmetic equations involved in process 23 and process 24. The result of these calculation processes is then applied to the fare calculation subroutine 25, which has within it a pre-programmed arithmetic equation for determining the fare utilizing the results of calculation 23 and calculation 24. The exact arithmetic equation schemes programmed into each subroutine are themselves obvious to one skilled in the art. The above referenced publication by Carnegie-Mellon University details the equations used in the programming of the computer system.

While, as before stated, it is believed that the invention can be implemented in various ways that will suggest themselves to those skilled in this art, once the underlying concepts of the invention are known, the particular types of components, hardware, interconnections and process and flow steps above-described are considered to be preferred; and additional details of construction and operation, not deemed necessary to describe herein less they detract from the important underlying features of the invention, may be obtained from the doctoral thesis of Fritz Faulhaber, entitled "A MultiOrigin/Destination Taxi System Hardware Design for Shared Ride Service," to be on deposit at the Engineering Library at the Carnegie-Mellon University in Pittsburgh, Pa., incorporated herein by reference, with particular circuits and structures for meter design and the like being also provided in the cited Letters Patent. Modifications will thus suggest themselves to those skilled in this art, and such are considered to fall within the spirit and scope of the invention as defined in the appended claims.

What is claimed is:

1. A method of paratransit fare computation and dispatching, that comprises, storing at a station information in a computer relating to routes and distances between street addresses and historical data as to time for normal transit therebetween under different times of day and traffic conditions; peripherally interfacing with the station through communication links with moving vehicles; communicating pick-up and deposit addresses along such links to the station from each vehicle for each hire thereof; calculating fares and estimating times of transit using said stored information; transmitting along said links, said calculated fares and estimated times of transit selectively addressed to the corresponding vehicle; and receiving and automatically displaying said transmitted fares and times at the respective vehicles.

2. A method as claimed in claim 1 and in which the calculating step includes calculating pluralities of fare and corresponding time data for overlapping hires, and the displaying step includes simultaneously displaying pluralities of fare and corresponding time data at the vehicles transmitted for overlapping hires.

3. A method as claimed in claim 1 and in which the fare and time transmissions are corrected during the calculating at the station by introducing corrections for different traffic and related conditions.

4. A method as claimed in claim 2 and in which said calculating is modified by up-dated changes in addresses communicated from said vehicles.

5. A method as claimed in claim 2 and in which the calculating includes selecting optimum routes between said addresses.

6. A method as claimed in claim 2 and in which the stored time data is corrected from time to time by comparison with real-time data obtained at said vehicles.

7. A method as claimed in claim 2 and in which data as to conditions in the vehicle is also communicated along said links for monitoring at the station.

8. A method as claimed in claim 2 and in which said displaying step includes disconnecting communication and control from said station and controlling the same locally from the vehicle.

* * * * *